3,703,541

PROCESS FOR THE PRODUCTION OF 3-HYDROXY-2,2,4-TRIMETHYLPENTYL ISOBUTYRATE

Itaru Takasu, Oi-machi, and Takaaki Sasaki and Akira Yamamoto, Arai, Japan, assignors to Daicel Ltd., Osaka, Japan
No Drawing. Filed Apr. 16, 1970, Ser. No. 29,262
Claims priority, application Japan, Apr. 24, 1969, 44/31,857
Int. Cl. C07c 67/10
U.S. Cl. 260—494     4 Claims

ABSTRACT OF THE DISCLOSURE

A process for producing 3-hydroxy-2,2,4-trimethylpentyl isobutyrate in which isobutyraldehyde is condensed by employing as a catalyst an alkali metal salt of a monohydric or polyhydric phenol which is either unsubstituted or has hydrocarbon or phenolic substituents in the aromatic nucleus thereof. The reaction is carried out at a temperature of 70°–100° C. and the catalyst concentration is in the range of from 0.3% to 5% by weight based on the weight of the aldehyde. The water content of the starting aldehyde is less than 5000 p.p.m.

---

This invention relates to a process for preparing 3-hydroxy-2,2,4-trimethylpentyl isobutyrate (which shall be abbreviated as HMPIB hereinafter) at a high conversion and a high yield while suppressing the formation of by-products by the condensation of isobutyraldehyde employing alkali metal salts of phenols as catalysts.

As is well known, HMPIB is a glycol ester of a high boiling point which is hardly soluble in water. Therefore, it has drawn attention as a solvent and plasticizer having remarkable properties, such as very good miscibility with resins, low solidifying point, excellent viscosity stability and low soiling property as performance characteristics of HMPIB in latex emulsion and paints. Particularly, in recent years, it has been recommended as a film forming assistant for paints. HMPIB can be synthesized by the condensation of three molecules of isobutyraldehyde. The most excellent of the known conventional processes for the preparation of HMPIB is disclosed in U.S. Pat. No. 3,091,632 (May 28, 1963) in which HMPIB is obtained at a conversion of 60% and yield of 90% based on consumed isobutyraldehyde, which is characterized by carrying out the condensation reaction of isobutyraldehyde by employing an alkali metal alkoxide as a catalyst and employing the alcohol corresponding to the aldehyde as the solvent for the alkoxide, and reducing the water content of the isobutyraldehyde to be preferably less than 10 p.p.m. in advance. However, this process had such defects that it was difficult with conventionally available distillation methods to reduce the water contents of the aldehyde and the alcohol to be less than 10 p.p.m. and that it was also difficult to separate the aldehyde and the alcohol to be recovered. According to our experiments, in case isobutyraldehyde of the water content of 600 p.p.m. and the isobutyric acid content of 3000 p.p.m. was reacted with sodium isobutoxide in a dry box, the best conversion was 62% and the composition of the reaction solution was 33.9% of HMPIB and 28.3% of by-products such as isobutyl isobutyrate and 2,2,4-trimethyl-1,3-pentanediol (which shall be abbreviated as TMPD hereinafter). HMPIB was obtained only at the yield of 54.3%.

We have discovered that the defects of conventional processes can be eliminated and the desired 3-hydroxy-2,2,4-trimethylpentyl-isobutyrate can be advantageously obtained by employing an alkali metal salt of a monohydric or polyhydric phenol or an alkali metal salt of a monohydric or polyhydric phenol having hydrocarbon or phenolic substituents in the aromatic nucleus thereof as the catalyst in the condensation reaction of isobutyraldehyde.

The catalyst to be used in the process of the present invention includes alkali metal salts of the following phenols: phenol, cresol (ortho, meta and para), isopropylphenol (ortho, meta and para), o-secondary, butylphenol, o-tertiary-butylphenol, 2,6-ditertiary-butylphenol, 4-methyl-2-tertiary-butylphenol, p-ethylphenol, hydroquinone, pyrogallol, resorcinol, tertiary-butylcatechol, phenylphenol (ortho, meta and para), p-methoxyphenol, chlorophenol (ortho, meta and para), 4,4'-methylenebis (2,6-ditertiary-butylphenol), 2,2-methylenebis (4-methyl-6-tertiary-butylphenol) and 2,2-bis-(4'-hydroxyphenyl)-propane. Preferred alkali metal salts are sodium and potassium salts. The alkali metal salt catalysts are made by adding an alkali hydroxide to a selected phenol compound, carrying out the reaction by heating the mixture and drying and solidifying the product by removing the water therefrom to obtail a solid alkali metal salt, or by adding an inert solvent such as benzene and toluene which forms an azeotrope with water to the above mixture, carrying out the reaction while removing the water formed by the reaction out of the reaction system by an azeotropic distillation and obtaining the alkali metal salt as a slurry with the solvent. This slurry can be used as mixed with the solvent for the condensation reaction of isobutyraldehyde to obtain HMPIB. However, the former method has difficulties that the alkali metal salt solidifies, adheres on the walls of the reactor, is hard to handle and is likely to absorb moisture. Therefore, the latter method of preparation by employing an azeotropic solvent is better than the former method.

In carrying out the reaction, isobutyraldehyde may be added dropwise into the catalyst plus solvent or the catalyst plus solvent may be added dropwise into the isobutyraldehyde. It is also possible to feed the both to the reactor at the same time. The process can be carried out either in a continuous manner or batch-wise. It should be noted that, since the catalyst is mostly in the form of a solid or slurry, the mixing of isobutyraldehyde and the catalyst during the reaction should be sufficient. The by-products may be formed due to the nonuniform reaction, if the mixing is insufficient. The reaction should be carried out at a temperature of 70 to 100° C., preferably at 75 to 85° C. If the reaction is carried out at temperatures below the preferred range of 75 to 85° C., the reaction rate will be lowered and, at temperatures above this preferred range, the formation of the by-products such as 2,2,4-trimethyl-1,3-pentanediol (TMPD) and 2,2,4-trimethyl-1,3-pentanediol diisobutyrate (TMPB) increases rapidly. The reaction time of about 20 minutes to 2 hours is usually sufficient.

The existence of water will have a remarkable influence on the formation of the by-products such as isobutyl isobutyrate and TMPD and the lowering of the conversion. Particularly, in case water mixes into the catalyst, the lowering of the conversion is remarkable. The reason is assumed to be that the catalyst activity is reduced extremely due to the incorporation of water.

We have carried out the reaction according to the process of the present invention by employing the starting butyraldehyde of a water content in the range of 600 to 3,000 p.p.m. and found that there was a tendency that, the lower is the water content, the higher are the conversion and the yield of HMPIB. If the water content of the starting butyraldehyde is more than 5000 p.p.m., the amount of the by-products will become considerably large and, therefore, 5000 p.p.m. will be the upper limit of the water content of isobutyraldehyde in carrying out the process of the present invention.

Therefore, it is preferable to carry out the reaction in a dry inert gas atmosphere such as nitrogen or methane. The catalyst concentration can be in the range of 0.3 to 5% by weight of the alkali metal salt of a phenol based on isobutyraldehyde. As the solvent to be used with the catalyst, any solvent which can form an azeotrope with water and is inert to the catalyst and aldehyde can be used. It is most preferable to use an aromatic hydrocarbon solvent such as benzene, toluene and xylene. However, ether solvents such as isopropylether, isoamylether and methylpropylether, alcohol solvents such as isobutyl alcohol and cyclohexanol and other hydrocarbon solvents can be also used. The amount of the solvent is preferably 0.3 to 0.8 times by volume as much as that of aldehyde.

According to the process of the present invention, even through about 1,000 p.p.m. of water were contained in the starting aldehyde, favorable results of the conversion of 77% and the HMPIB yield of 92% were obtained under the optimum conditions. Even in case the water content was 2,7000 p.p.m., the conversion was 71% and the yield was 89%. Since the water content of a commercially available isobutyraldehyde is about 3000 p.p.m., such isobutyraldehyde can be used as it is in the process of the present invention. Therefore, it can be said that the process of the present invention is much more excellent than the conventional processes for the preparation of HMPIB from isobutyraldehyde such as the process disclosed in U.S. Pat. No. 3,091,632.

HMPIB may, whenever it is formed by the condensation of isobutyraldehyde in the presence of such basic catalysts, contain some amount of an isomeric substance, 1-hydroxy-2,2,4 - trimethylpentyl - (3)isobutyrate, hardly separable either as to the component or as to the performance. The results of later investigations showed that these monoesters of 2,2,4-trimethyl-1,3-pentanediol were discriminated solely by the n.m.r.-spectrum technique.

The conversion mentioned in the above and in the following examples is a percentage of the amount of isobutyraldehyde fed into the reaction less the amount of the unreacted isobutyraldehyde after the reaction (that is, the amount of isobutyraldehyde changed by the reaction) on the amount of isobutyraldehyde fed into the reaction. The yield of HMPIB is a percentage of the amoun of HMPIB obtained after the reaction on the amount of isobutyraldehyde changed by the reaction.

The process of the present invention is further illustrated by the following examples. In the samples, all percentages are by weight.

EXAMPLE 1

Sodium salt of o-cresol was prepared in a toluene solvent, was well dehydrated by azeotropic dehydration and the concentration of the salt in toluene was adjusted so as to be 10% by weight. 30 g. of this catalyst solution were fed into a three-necked flask of 200 ml. sealed with $N_2$ in advance and were vigorously stirred while 60 g. of isobutyraldehyde containing 900 p.p.m. of water were gradually added. While adjusting the temperature of the reaction solution be 80 ±5° C., the aldehyde was added dropwise 60 minutes. Then the solution was maintained at 80° C. for 60 minutes to complete the reaction. The composition of the solution obtained by the reaction except toluene was 77.8% of HMPIB, 3.9% of TMPD, 3.1% of other by-products and 15.2% of the unreacted aldehyde. The yield of HMPIB was 92%.

EXAMPLE 2

The sodium salt of o-cresol catalyst was prepared in the same manner as in Example 1 and the reaction was carried out in the same manner as in Example 1 except that isobutyraldehyde containing 2,740 p.p.m. of water was employed. The composition of the solution obtained by the reaction except toluene was 1.7% of HMPIB, 2.9% of TMPD, 5.0% of other by-products and 20.2% of the unreacted aldehyde. The yield of HMPIB was 89.5%.

EXAMPLE 3

Potassium salt of o-cresol was prepared in a toluene solvent and the concentration of the salt in toluene was adjusted so as to be 10% by weight. Then isobutyraldehyde containing 2,740 p.p.m. of water was made to react by the same operation as in Example 1 to obtain a reaction solution having the composition (except toluene) of 65.2% of HMPIB, 12.4% of TMPD, 6.2% of other by-products and 16.2% of the unreacted aldehyde. The yield of HMPIB was 78%.

EXAMPLE 4

Sodium salt of para-cresol in toluene was prepared in the same manner as in Example 1 and isobutyraldehyde containing 2,740 p.p.m. of water was made to react under the same conditions as in Example 1 to obtain a reaction solution having the concentration of 77.1% of HMPIB, 10.1% of TMPD, 6.8% of other by-products and 5.4% of the unreacted aldehyde. The yield of HMPIB was 80.0%.

EXAMPLE 5

Sodium salt of p-cresol was prepared in a toluene solvent and the concentration of the slurry was adjusted so as to be 10% by weight. 10 g. of this slurry were fed into a three necked flask of 200 ml. sealed with $N_2$ in advance. 60 g. of isobutyraldehyde containing 910 p.p.m. of water were added dropwise into the flask during 30 minutes. The temperature of the solution was adjusted to be at 80±5° C. with only the reaction heat and was then maintained at 80° C. for 60 minutes to obtain the reaction product having the composition (except toluene) of 53.0% of HMPIB, 0.5% of TMPD, 21.0% of other by-products and 25.4% of the unreacted aldehyde. The yield of HMPIB was 75.5%.

EXAMPLE 6

Sodium salt of phenol was prepared without using any solvent and was sufficiently dehydrated. 3 g. of this catalyst were dissolved in 27 g. of toluene and the solution was fed into a reactor sealed with $N_2$ in advance. The temperature of this catalyst solution was adjusted to be at 80° C. and was stirred while 60 g. of isobutyraldehyde (containing 1,000 p.p.m. of water) were added dropwise into the reactor during 2 hours. Then the solution was maintained at 80° C. for 1 hour to obtain the reaction product having the composition (except solvent) of 24.0% of HMPIB, 21.6% of TMPD, 3.0% of other by-products and 51.0% of the unreacted aldehyde. The yield of HMPIB was 49.4%.

EXAMPLE 7

3 g. of sodium salt of 4-methyl-2-tertiary-butylphenol were added into an $N_2$-sealed reactor, 27 g. of benzene was added thereto and the mixture were heated to 80° C. 60 g. of isobutyraldehyde (containing 1,100 p.p.m. of water) were added dropwise into this reactor during 1 hour. After the addition ended, the solution was maintained at 80° C. for 1 hour to obtain a reaction product having the composition (except solvent) of 51.3% of HMPIB, 8.6% of TMPD, 4.1% of other by-products and 36.0% of the unreacted aldehyde. The yield of HMPIB was 80.2%.

EXAMPLE 8

Sodium salt of a mixed cresol (of o:m:p=about 1:1:1) was prepared in a toluene solvent and the concentration was adjusted to be 10%. 30 g. of this catalyst solution were fed into a reactor sealed with $N_2$ in advance. 60 g. of isobutyraldehyde containing 800 p.p.m. of water were fed dropwise into the reactor. The solution was adjusted to be at 80±5° C. with only the reaction heat by controlling the dropping velocity of isobutyraldehyde.

The dropping time of isobutyraldehyde was 20 minutes. Then the solution was maintained at 80° C. for 1 hour. The result of the analysis of the reaction solution was of 69.3% of HMPIB, 3.9% of TMPD, 4.3% of other by-products and 23% of the unreacted aldehyde. The yield of HMPIB was 90%.

EXAMPLE 9

Sodium salt of 2,2-bis-(4'-hydroxyphenyl)-propane was prepared in a toluene solvent and HMPIB was synthesized by the same operation as in Example 1 by employing isobutyraldehyde containing 930 p.p.m. of water.

The result of the analysis of the reaction solution (except solvent) was of 43.7% of HMPIB, 16.3% of TMPD, 7.2% of other by-products and 32.8% of the unreacted aldehyde. The yield of HMPIB was 65%.

EXAMPLE 10

Potassium salt of hydroquinone was prepared in a toluene solvent and HMPIB was synthesized under the same conditions as in Example 9. The analytical values of the reaction solution were 36.4% of HMPIB, 12.1% of TMPD, 8.7% of other by-products and 42.8% of the unreacted aldehyde. The yield of HMPIB was 64%.

EXAMPLE 11

Sodium salt of o-isopropylphenol was prepared in a toluene solvent and the water was removed by azeotropic dehydration. The concentration was adjusted so as to be 5% by weight based on toluene. 200 g. of isobutyraldehyde containing 1,730 p.p.m. of water were gradually added to 120 g. of this catalyst solution during 60 minutes while adjusting the reaction temperature to be 80±2° C. Thereafter, the solution was maintained at 80° C. for 120 minutes to complete the reaction. The composition of the reaction solution (except toluene) was of 35.7% of HMPIB, 0.7% of TMPD, 0.8% of TMPB and 62.5% of the unreacted aldehyde. The yield of HMPIB was 93.8%.

EXAMPLE 12

The reaction was carried out in the same manner as in Example 11 except that sodium salt of o-sec-butyl-phenol was used instead of the sodium salt of o-isopropylphenol and 200 g. of isobutyraldehyde containing 700 p.p.m. of water were used. The composition of the reaction solution (except solvent) was of 36.9% of HMPIB, 0.9% of TMPD, 3.8% of TMPB and 58.0% of the unreacted aldehyde. The yield of HMPIB was 87.6%.

EXAMPLE 13

The reaction was carried out in the same manner in Example 11 except that sodium salt of o-tert-butylphenol was used instead of the sodium salt of o-isopropylphenol and 200 g. of isobutyraldehyde containing 700 p.p.m. of water were used. The composition of the reaction solution (except solvent) was of 18.2% of HMPIB, 1.3% of TMPD, 3.6% of TMPB and 76.5% of the unreacted aldehyde. The yield of HMPIB was 75.9%.

EXAMPLE 14

The reaction was carried out in the same manner as in Example 11 except that sodium salt of p-phenylphenol was used instead of the sodium salt of o-isopropylphenol and 200 g. of isobutyraldehyde containing 690 p.p.m. of water were used. The composition of the reaction solution (except toluene) was of 71.0% of HMPIB, 0.7% of TMPD, 0.7% of TMPB and 27.5% of the unreacted aldehyde. The yield of HMPIB was 97.3%.

EXAMPLE 15

The reaction was carried out in the same manner as in Example 11 except that sodium salt of p-phenylphenol was used instead of the sodium salt of o-isopropylphenol and 200 g. of isobutyraldehyde containing 690 p.p.m. of water were used. The composition of the reaction solution except toluene was of 65.3% of HMPIB, 0.9% of TMPB, 1.5% TMPB and 31.0% of the unreacted aldehyde. The yield of HMPIB was 94.6%.

EXAMPLE 16

The reaction was carried out in the same manner as in Example 11 except that sodium salt of p-methoxyphenol was used instead of the o-isopropylphenol sodium salt and 200 g. of isobutyraldehyde containing 610 p.p.m. of water were used. The composition of the reaction solution except toluene was of 72.0% of HMPIB, 3.3% of TMPD, 4.1% of TMPB and 19.5% of the unreacted aldehyde. The yield of HMPIB was 89.4%.

EXAMPLE 17

The reaction was carried out in the same manner as in Example 11 except that sodium salt of p-ethylphenol was used instead of the sodium salt of o-isopropylphenol and 200 g. of isobutyraldehyde containing 700 p.p.m. of water were used. The composition of the reaction solution except toluene was of 73.4% of HMPIB, 5.4% of TMPD, 7.0% of TMPB and 14.0% of the unreacted aldehyde. The yield of HMPIB was 83.6%.

EXAMPLE 18

The reaction was carried out in the same manner as in Example 11 except that sodium salt of o-chlorophenol was used instead of the o-isopropylphenol sodium salt and 200 g. of isobutyraldehyde containing 2,150 p.p.m. of water were used. The composition of the reaction solution except toluene was of 35.3% of HMPIB, 0.1% of TMPD, 0.1% of TMPB and 64.0% of the unreacted aldehyde. The yield of HMPIB was 98.0%.

EXAMPLE 19

The reaction was carried out in the same manner as in Example 11 except that sodium salt of o-tertiary-butyl-catechol was used instead of the sodium salt of o-isopropylphenol and 200 g. of isobutyraldehyde containing 610 p.p.m. of water were used. The composition of the reaction solution except toluene was of 69.5% of HMPIB, 84% of TMPD, 11.9% of TMPB and 10.0% of the unreacted aldehyde. The yield of HMPIB was 76.6%.

EXAMPLES 20 to 23

The reaction conditions and operation in Example 11 were followed except isobutyraldehydes of different water contents were employed and sodium salts of m-cresol, m-chlorophenol, p-chlorophenol and resorcinol instead of the o-isopropylphenol sodium salt were employed as the catalyst, respectively. The results as shown in the following table were obtained.

| Example No. | Kind of catalysts | Content (p.p.m.) of water in isobutyraldehyde | Reaction solution composition (percent) | | | | | Yield (percent) of HMPIB |
|---|---|---|---|---|---|---|---|---|
| | | | HMPIB | TMPD | TMPB | Other by-products | Unreacted aldehyde | |
| 20 | m-Cresol-Na | 1,200 | 32.3 | 1.3 | 0.7 | 0.7 | 65.0 | 92.3 |
| 21 | m-Chlorophenol-Na | 1,250 | 7.9 | 0.3 | | 0.8 | 91.0 | 87.6 |
| 22 | p-Chlorophenol-Na | 1,250 | 15.6 | 2.3 | | 2.9 | 80.0 | 80.0 |
| 23 | Resorcinol-Na | 2,150 | 22.3 | 3.7 | 1.8 | 1.2 | 71.0 | 83.2 |

What we claim is:

1. A process for preparing 3-hydroxy-2,2,4-trimethylpentyl isobutyrate which comprises contacting (1) isobutyraldehyde having a water content of less than about 5,500 p.p.m., with (2) an alkali metal salt of a phenol compound selected from the group consisting of monohydric and polyhydric monocyclic hydrocarbon phenols, nuclear substituted monohydric and polyhydric phenols wherein the substituent or substituents on the aromatic nucleus is selected from the group consisting of lower alkyls, phenyl, chloro and methoxy, 4,4-methylenebis (2,6-ditertiary-butylphenol), 2,2-methylenebis (4-methyl-6-tertiary-butylphenol) and 2,2-bis (4'-hydroxyphenyl)-propane as a catalyst, at a temperature of 70–100° C., at a catalyst concentration of 0.3 to 5.0% by weight based on the aldehyde, for a time period in the range of from about 20 minutes to about 2 hours.

2. The process according to claim 1, in which the isobutyraldehyde has a water content of 600 to 3000 p.p.m.

3. The process according to claim 2, wherein said isobutyraldehyde is contacted with a dehydrated catalyst slurry consisting of the catalyst and an organic solvent which is inert to the catalyst and isobutyraldehyde and which is capable of forming an azeotrope with water, at a temperature of 75–85° C., the amount of the solvent being in the range of from 0.3 to 0.8 times by volume, based on the aldehyde.

4. The process according to claim 1, in which said phenol compound is selected from the group consisting of cresol, isopropylphenol, o-secondary-butylphenol, o-tertiary-butylphenol, 2,6-ditertiary-butylphenol, 4-methyl-2 - tertiary-butylphenol, p-ethylphenol, hydroquinone, resorcinol, pyrogallol, tertiary-butylcatechol, p-methoxyphenol, phenylphenol, chlorophenol, 4,4-methylenebis (2,6-ditertiary - butylphenol), 2,2 - methylenebis (4-methyl-6-tertiary-butylphenol) and 2,2-bis (4'-hydroxyphenyl)-propane.

References Cited

UNITED STATES PATENTS 3,091,632   5/1963   Hagemeyer, et al. ___ 260—494

VIVIAN GARNER, Primary Examiner

U.S. Cl. X.R.

260—635 R

UNITED STATES PATENT OFFICE
CERTIFICATE OF CORRECTION

Patent No. 3,703,541    Dated November 21, 1972

Inventor(s) Itaru Takasu, Takaaki Sasaki and Akira Yamamoto

It is certified that error appears in the above-identified patent and that said Letters Patent are hereby corrected as shown below:

Col. 7, line 5; please change "5,500 p.p.m." to ---5,000 p.p.m.---.

Signed and sealed this 12th day of June 1973.

(SEAL)
Attest:

EDWARD M. FLETCHER, JR.
Attesting Officer

ROBERT GOTTSCHALK
Commissioner of Patents